(12) United States Patent
Dannenhauer et al.

(10) Patent No.: US 6,607,209 B2
(45) Date of Patent: Aug. 19, 2003

(54) GAS BAG MODULE

(75) Inventors: Reiner Dannenhauer, Welsheim (DE);
Jens Debler, Herlikofen (DE);
Alexander Heilig, Wibgoldingen (DE);
Adelbert Ott, Schechingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/931,262

(22) Filed: Aug. 16, 2001

(65) Prior Publication Data
US 2002/0070535 A1 Jun. 13, 2002

(30) Foreign Application Priority Data
Aug. 16, 2000 (DE) ..................... 200 14 064 U

(51) Int. Cl.7 ..................... B60R 21/20; B60R 21/26
(52) U.S. Cl. ..................... 280/728.2; 280/740
(58) Field of Search ..................... 280/740, 736, 280/742, 737, 728.3, 732, 728.2

(56) References Cited
U.S. PATENT DOCUMENTS

| | | | |
|---|---|---|---|
| 3,618,976 A | | 11/1971 | Leising et al. |
| 3,797,853 A | * | 3/1974 | Grosch et al. ............... 280/740 |
| 5,437,472 A | * | 8/1995 | Kuretake et al. ............ 280/740 |
| 5,893,578 A | * | 4/1999 | Berger ......................... 280/740 |
| 6,106,002 A | * | 8/2000 | Haesaert et al. ............ 280/740 |
| 6,126,195 A | * | 10/2000 | Lutz ............................. 280/736 |

FOREIGN PATENT DOCUMENTS

| | | |
|---|---|---|
| DE | 2118745 B2 | 11/1972 |
| DE | 2360315 A1 | 6/1975 |
| DE | 4342492 A1 | 7/1994 |
| DE | 297 21 643 U1 * | 5/1998 |
| DE | 19822729 A1 | 11/1999 |
| WO | 96/25309 * | 8/1996 |

* cited by examiner

Primary Examiner—Peter C. English
(74) Attorney, Agent, or Firm—Tarolli, Sundheim, Covell & Tummino L.L.P.

(57) ABSTRACT

A gas bag module for use in vehicles has a housing and an inflator arranged on the bottom of the housing. A normally folded gas bag is accommodated within the housing. A diffusor is arranged between the inflator and the folded gas bag. The diffusor consists of a first diffusor part fixed to the bottom of the housing and a second diffusor part movably mounted on the first diffusor part. The second diffusor part is movable with respect to the first diffusor part from a normal retracted position closer to the bottom of the housing to an advanced position further away from the bottom of the housing under the action of gas pressure generated by the inflator.

11 Claims, 3 Drawing Sheets

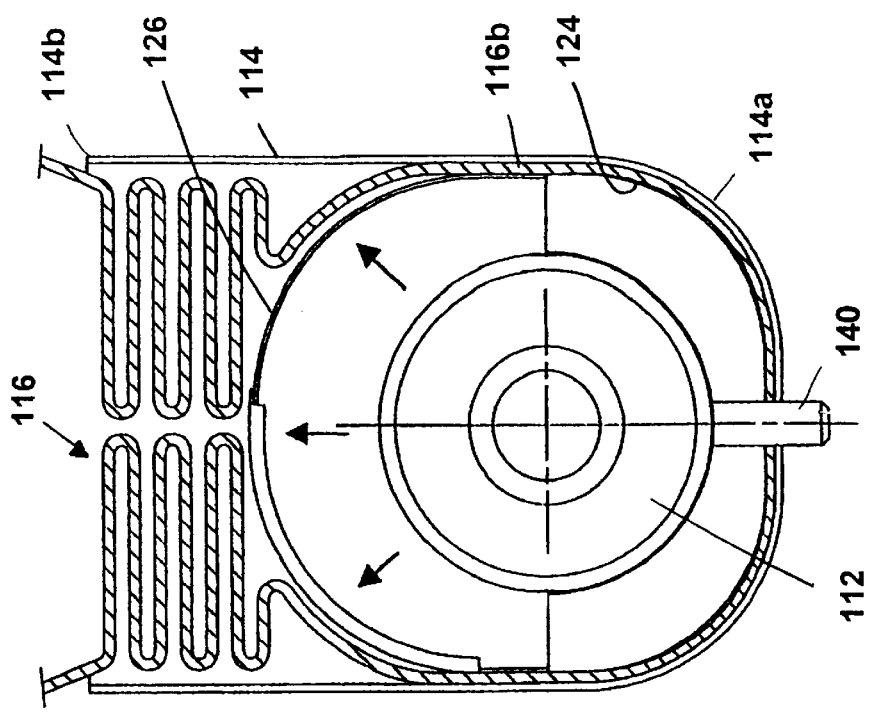
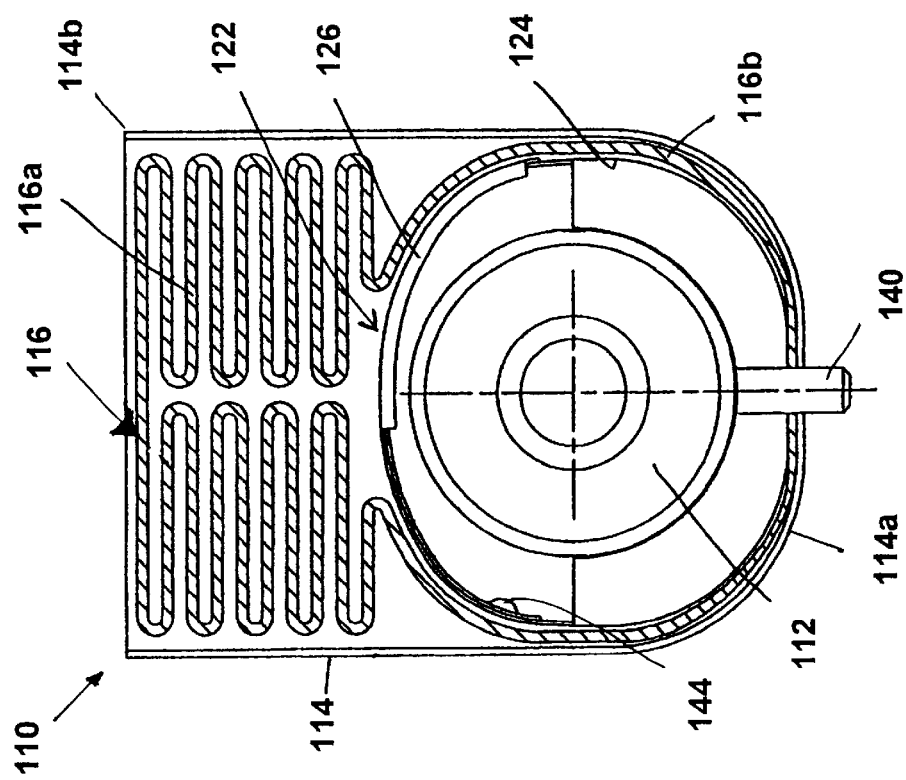

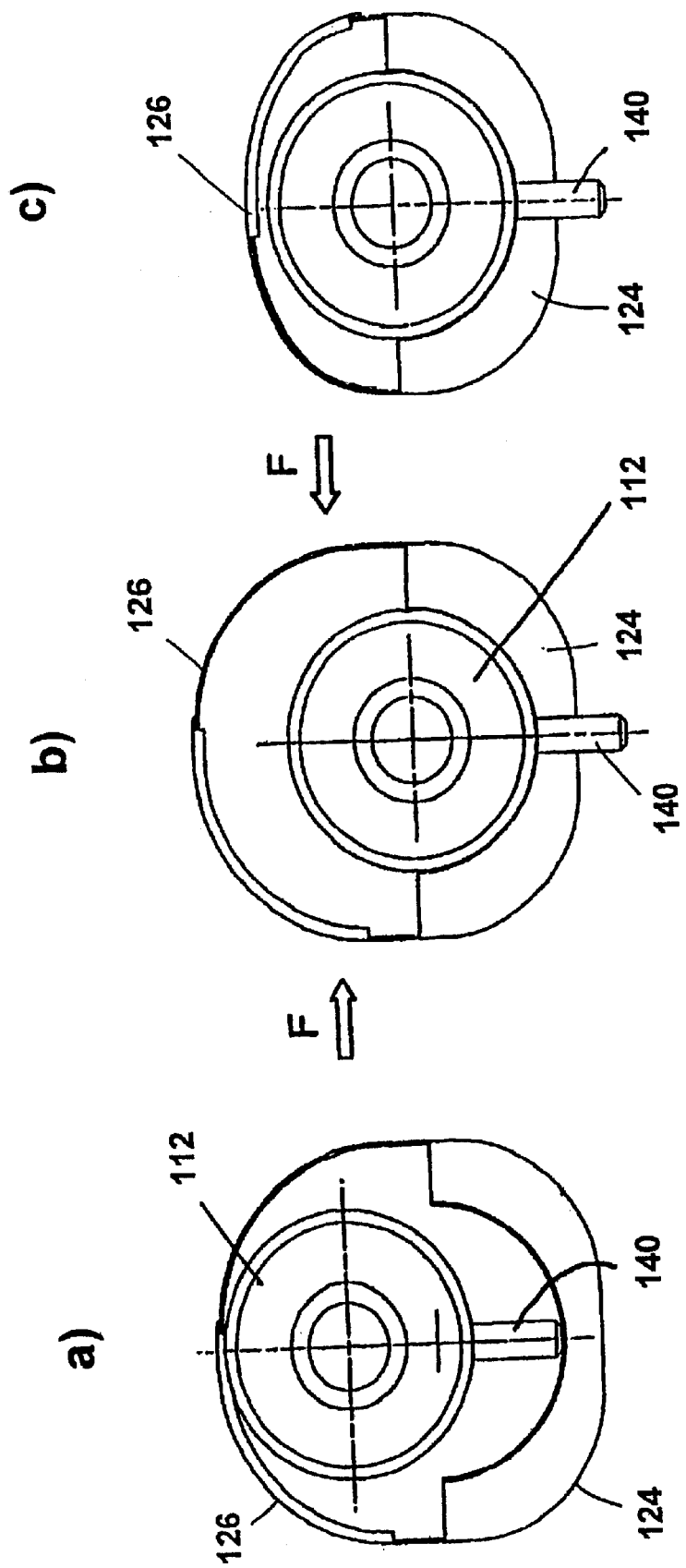

GAS BAG MODULE

BACKGROUND OF THE INVENTION

The present invention relates to a gas bag module comprising a housing, an inflator arranged on the bottom of the housing, a folded gas bag behind a cover closing off the housing and a diffusor between the inflator and the folded gas bag.

In most prior art gas bag modules the gas bag wall is directly exposed to hot gas produced by a pyrotechnic inflator to inflate the gas bag. The module generally comprises a door hinged to an edge of the module housing remote from its bottom, and normally covering the folded gas bag to retain it within the module housing in the folded condition. When the gas bag is inflated, it urges against the door which swings open so that the gas bag is free to deploy. In some prior art gas bag modules a diffusor is arranged between the folded gas bag and the inflator to provide for a distributed and controlled flow of gas into the gas bag.

SUMMARY OF THE INVENTION

The present invention provides a gas bag module that enables an improved gas bag deployment and a controlled flow of gas from the inflator into the gas bag upon inflation.

According to the invention, a gas bag module is provided that comprises a housing with a bottom, an inflator arranged on the bottom of the housing, a folded gas bag and a diffusor between the inflator and the folded gas bag. The diffusor consists of a first diffusor part fixed to the bottom of the housing and a second diffusor part movably mounted on the first diffusor part. The second diffusor part is movable with respect to the first diffusor part from a normal retracted position closer to the bottom of the housing to an advanced position further away from the bottom of the housing under the action of gas pressure generated by the inflator. In a first embodiment of the invention, the second, movable diffusor part on movement from the retracted to the advanced position, pushes the folded gas bag package out of the housing prior to inflation of the gas bag, thereby permitting the gas bag to deploy in preferred directions. In a second embodiment where the gas bag module has a hinged door covering the folded gas bag, the second, movable diffusor part on activation of the inflator is first exposed to gas pressure, then urges against the cover to swing it open, moves to its advanced position and only then permits gas to flow into the gas bag for inflation. Since the door is open prior to actual inflation of the gas bag, an improved control of gas bag deployment is achieved.

SHORT DESCRIPTION OF DRAWINGS

The invention will now be detailed by way of two preferred embodiments as shown in the attached drawings in which FIG. 1 is a cross-sectional view of a gas bag module according to a fist embodiment in a normal inactive condition;

FIG. 3 is a cross-sectional view of a gas bag module according to a second embodiment in a normal inactive condition;

FIG. 4 is a cross-sectional view of the second embodiment in an activated condition;

FIGS. 5a, 5b and 5c schematically illustrate three successive mounting steps in the second embodiment.

DETAILED DESCRIPTION OF PREFERRED EMBODIMENTS

Figure 1:
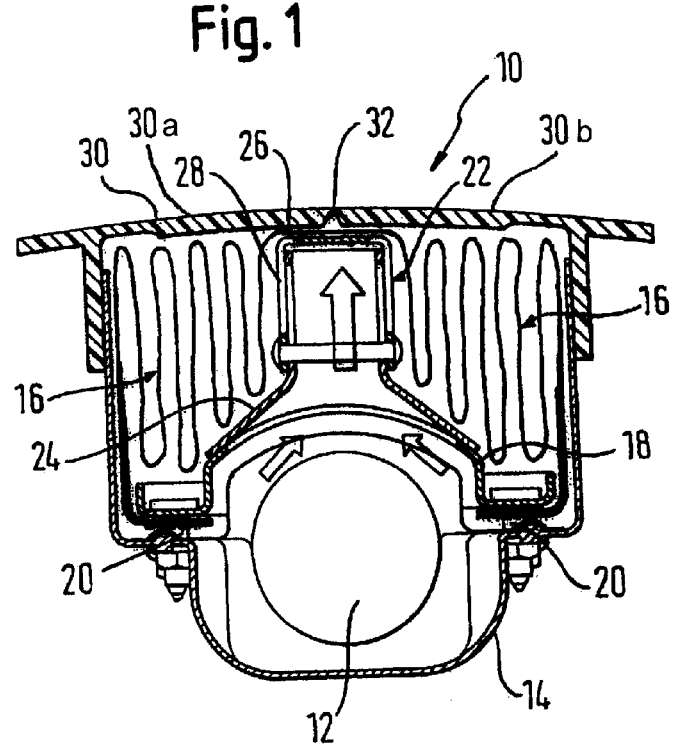
Figure 2:
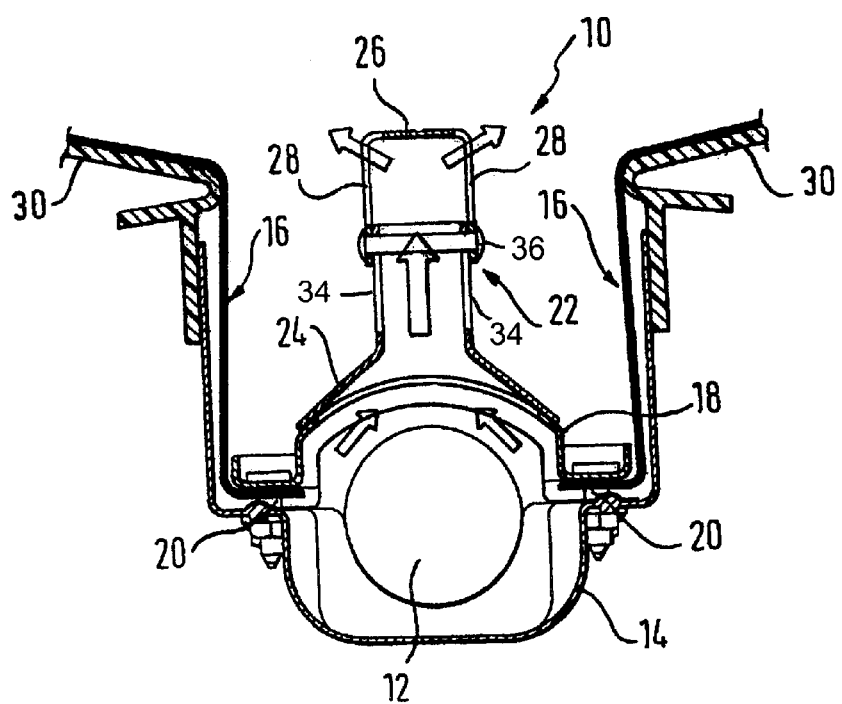
FIG. 2 is a cross-sectional view of the gas bag module in an activated condition.

Referring first to FIGS. 1 and 2, a gas bag module 10 has a pyrotechnic inflator 12 accommodated in a housing 14. A folded gas bag 16 has an edge clamped between the bottom of housing 14 and a base part 18 by means of bolt fasteners 20. A diffuser 22 has a first, fixed diffusor part 24 connected to the base part 18 and tapered bottle-necked upwardly, i.e. in a direction away from the bottom of housing 14. The diffusor 22 has a second, movable diffusor part 26 located above the fixed diffusor part 24 and slidingly mounted thereon. The movable diffusor part 26 has gas passage ports 28 in two opposed lateral walls interconnected by a closed top wall. The folded gas bag 16 forms a package accommodated within housing 14 on both sides of the diffusor 22. The housing 14 has an open side opposite to its bottom and defined by a free edge. A cover 30 comprising two hinged doors 30a, 30b is fitted over the free edge of housing 14 to close the open side thereof. The hinged doors 30a, 30b of cover 30 are connected along an intended tear line 32. The movable diffusor part 26 is in a retracted position closer to the bottom of housing 14, and the gas passage ports 28 are closed by opposed wall portions of the fixed diffusor part 24. The closed top wall of movable diffusor part 26 is slightly spaced from the inner face of cover 30 beneath tear line 32, the gas bag 16 having an unfolded wall portion extending between cover 30 and the closed top wall of diffusor part 26.

In the activated condition of the gas bag module (FIG. 2), the gas bag 16 is deployed and the hinged doors 30a, 30b are separated along tear line 32 and swung open. The movable diffusor part 26 has been moved to an advanced position partially projecting beyond the free edge of housing 14. In this position, the movable diffusor part 26 also projects beyond the side walls of fixed diffusor part 24 so that the gas passage ports 28 are free.

On activation of the pyrotechnic inflator 12, hot gas first flows from the inflator 12 past the base plate 18 of the diffusor in a direction indicated by arrows in FIG. 1 and then into the fixed part 24 of diffusor 22. The closed top wall of movable diffusor part 26 is exposed to pressure of the hot gas so that movable diffusor part 26 urges against cover 30 from inside in the manner of a pneumatic piston. Under the pressure from movable diffusor part 26, the cover 30 ruptures along tear line 32 and diffusor part 26 is moved to its advanced position, pushing the hinged doors of cover 30 open. Movement of diffusor part 26 on fixed diffusor part 24 is guided by a pair of parallel elongate slots 34 in the opposed lateral walls of diffusor part 24 and a pin 36 extending through these slots 34 and attached at its ends to the spaced side walls of movable diffusor part 26. The slots 34 extend in a direction perpendicular to the bottom of housing 14 and have a closed end remote from the housing bottom forming an abutment for pin 36 to define the advanced position of movable diffusor part 26.

Up to the point in time where the movable diffusor part 26 has reached the advanced position and the doors 30a, 30b are swung open, the gas bag 16 is still non-pressurized and is not involved in the opening action of the cover 30. Since the gas passage ports 28 are now free, gas produced by inflator 12 flows through the ports 28 and into gas bag 16, which starts to deploy. The gas passage ports 28 being oriented mainly in a radial direction with respect to a central axis of the module, the gas bag will tend to deploy predominantly in lateral directions, according to the directions of gas flow indicated by arrows in FIG. 2.

After deployment of the gas bag 16, the movable diffusor part 26 can be pushed back to its retracted position shown in FIG. 1. or, alternatively, is automatically returned to its retracted position by a return spring arrangement (not shown).

In the embodiment of FIGS. 3 to 5, a gas bag module 110 for use in a vehicle has a generally cylindrical pyrotechnic inflator 112 within a trough-shaped housing 114 with a bottom 114a and an open side opposite the bottom 114a and defined by a free edge 114b. A folded gas bag 116 is accommodated within housing 114 above the inflator 112. A diffusor 122 is arranged between the folded gas bag 116 and the inflator 112 so as to encircle the inflator with a radial spacing. The folded gas bag 116 forms a package 116a located above the diffusor 122 with respect to the bottom 114a of housing 114 and has a wall portion 116b extending from the package 116a and around the diffusor 122. The diffusor 122 consists of a first, fixed diffusor part 124 attached to the bottom 114a of housing 114 so that the wall portion 116b of gas bag 116 is clamped between the fixed inflator part 124 and the bottom 114a of housing 114, and of a second, movable part 126 provided with gas flow passages and slidingly mounted on the fixed part 124. The first and second diffusor parts 124, 126 are each formed of a shaped metal sheet. Fixed diffusor part 124 has an arched shape substantially corresponding to that of bottom 114a of housing 114, and movable diffusor part 126 is of a generally similar arched shape. When assembled, both diffusor parts 124, 126 form a somewhat flattened cylinder with open axial ends. The longitudinal, or axially extending, edge portions of both diffusor parts 124, 126 overlap and slide on each other, permitting a limited sliding movement of movable part 126 with respect to fixed part 124 in a direction away from bottom 114a of housing 114. Thus, the second diffusor part 126 is movable from a retracted position (FIG. 3) closer to bottom 114a of housing 114 to an advanced position (FIG. 4).

Movement of the second diffusor part 126 from the retracted to the advanced position serves a twofold purpose.

First, with reference to FIG. 5, the inflator 112 has mounting studs 140 rigidly connected to its outer cylindrical envelope to project radially there from. The mounting studs are intended to extend through aligned openings in the fixed diffusor part 124 and in the bottom 114a of housing 114. When the movable diffusor part 126 is in the advanced position as seen in FIG. 5a), the inflator with the projecting mounting studs 140 can be inserted into the diffusor from an open axial end thereof. The mounting studs 140 are then inserted through the openings in the bottom of fixed diffusor part 124 as seen in FIG. 5b), and the movable diffusor part 126 is pushed to the retracted position as seen in FIG. 5c). The assembly consisting of inflator 112 and diffusor parts 124, 126 can now be inserted into wall portion 116b of gas bag 116, and the assembly with the gas bag is inserted into housing 114 so that the mounting studs 140 extend through corresponding openings in the bottom 114a of housing 114, as seen in FIG. 3.

Second, with reference to FIG. 4, when the diffusor part 126 is moved to the advanced position, the folded gas bag packet 116a is pushed out of the housing 114, thereby considerably facilitating deployment of gas bag 116.

In the preferred embodiment, the diffusor parts 124, 126 are releasably latched on each other in the retracted position of part 126. Both parts 124, 126 have embossed complementary latching configurations such as a convex protuberance 144 in one part (FIG. 3) and a corresponding depression or hole in the other part.

Although not shown in the drawings, the diffusor of the embodiment in FIGS. 3 to 5 has abutment means to limit movement of diffusor part 126 to the advanced position and to define such position. For example, the slot and pin arrangement of the embodiment in FIGS. 1 and 2 could be easily adapted to the embodiment of FIGS. 3 to 5.

What is claimed:

1. A gas bag module comprising a housing with a bottom, an inflator arranged on the bottom of said housing, a folded gas bag and a diffusor between said inflator and said folded gas bag, said diffusor comprising a first diffusor part fixed to the bottom of said housing and a second diffusor part movably mounted on said first diffusor part, said second diffusor part being movable with respect to said first diffusor part from a normal retracted position closer to the bottom of said housing to an advanced position further away from the bottom of said housing under the action of gas pressure generated by said inflator, wherein said second diffusor part is releasably latched to said first diffusor part in said normal retracted position.

2. The gas bag module as set forth in claim 1, wherein said inflator has projecting mounting studs extending through said first diffusor part and said housing bottom.

3. The gas bag module as set forth in claim 1, wherein both of said first and second diffusor parts are formed by a shaped metal sheet.

4. A gas bag module comprising a housing with a bottom, an inflator arranged on the bottom of said housing, a folded gas bag and a diffusor between said inflator and said folded gas bag, said diffusor comprising a first diffusor part fixed to the bottom of said housing and a second diffusor part movably mounted on said first diffusor part, said second diffusor part being movable with respect to said first diffusor part from a normal retracted position closer to the bottom of said housing to an advanced position further away from the bottom of said housing under the action of gas pressure generated by said inflator, wherein both of said first and second diffusor parts are formed by a shaped metal sheet, wherein said metal sheets have embossed latching members that engage releasably with each other in the retracted position of said second diffusor part.

5. A gas bag module comprising a housing with a bottom, an inflator arranged on the bottom of said housing, a folded gas bag and a diffusor between said inflator and said folded gas bag, said diffusor comprising a first diffusor part fixed to the bottom of said housing and a second diffusor part movably mounted on said first diffusor part, said second diffusor part being movable with respect to said first diffusor part from a normal retracted position closer to the bottom of said housing to an advanced position further away from the bottom of said housing under the action of gas pressure generated by said inflator, and abutment means defining the advanced position of said second diffusor part, wherein said abutment means comprise at least one pair of opposed elongate slots in said first diffusor part and a pin attached to said second diffusor part and extending through said slots, said slots extending in a direction of movement between said retracted and advanced positions of said second diffusor part.

6. A gas bag module comprising a housing with a bottom, an inflator arranged on the bottom of said housing, a folded gas bag and a diffusor between said inflator and said folded gas bag, said diffusor comprising a first diffusor part fixed to the bottom of said housing and a second diffusor part, said first and second diffusor parts being arranged above said inflator in a direction away from the bottom of said housing, said second diffusor part being movable with respect to said first diffusor part from a normal retracted position closer to the bottom of said housing to an advanced position further away from the bottom of said housing under the action of gas pressure generated by said inflator, said second diffusor part having radial gas passage openings and, in the advanced position thereof, partly projects out of said housing, said radial gas passage openings being oriented to allow for a predominant radial direction of gas flow through said openings.

7. The gas bag module as set forth in claim 6, wherein said second diffusor part is movable back from said advanced to said retracted position.

8. The gas bag module as set forth in claim 6, wherein said gas passage openings are closed and are opened in the retracted and advanced positions, respectively, of said second diffusor part.

9. The gas bag module as set forth in claim 6, comprising a door hinged to an edge portion of said housing remote from said bottom, wherein said second diffusor part when moving from the retracted to the advanced position urges against said door to open said door prior to deployment of said gas bag.

10. The gas bag module as set forth in claim 6, wherein said folded gas bag forms a package arranged on a side of said second diffusor part remote from said housing bottom.

11. The gas bag module as set forth in claim 6, comprising abutment means defining the advanced position of said second diffusor part.

* * * * *